US011096175B2

(12) United States Patent
Awad

(10) Patent No.: US 11,096,175 B2
(45) Date of Patent: Aug. 17, 2021

(54) COMMUNICATION SYSTEM

(71) Applicant: NEC CORPORATION, Tokyo (JP)

(72) Inventor: Yassin Aden Awad, Uxbridge (JP)

(73) Assignee: NEC CORPORATION, Tokyo (JP)

( * ) Notice: Subject to any disclaimer, the term of this patent is extended or adjusted under 35 U.S.C. 154(b) by 179 days.

(21) Appl. No.: 16/321,886

(22) PCT Filed: Aug. 2, 2017

(86) PCT No.: PCT/JP2017/027980
§ 371 (c)(1),
(2) Date: Jan. 30, 2019

(87) PCT Pub. No.: WO2018/025893
PCT Pub. Date: Feb. 8, 2018

(65) Prior Publication Data
US 2019/0182823 A1    Jun. 13, 2019

(30) Foreign Application Priority Data

Aug. 3, 2016 (GB) ..................... 1613407

(51) Int. Cl.
*H04W 72/04* (2009.01)
*H04W 8/24* (2009.01)
(Continued)

(52) U.S. Cl.
CPC ......... *H04W 72/048* (2013.01); *H04L 5/0053* (2013.01); *H04W 8/24* (2013.01);
(Continued)

(58) Field of Classification Search
None
See application file for complete search history.

(56) References Cited

U.S. PATENT DOCUMENTS

2010/0210218 A1    8/2010   Iwamura et al.
2011/0267955 A1    11/2011  Dalsgaard
(Continued)

FOREIGN PATENT DOCUMENTS

JP    2013-529402 A    7/2013
WO    2007/051193 A2    5/2007
(Continued)

OTHER PUBLICATIONS

"On eMTC maximum TX power and returning time", Intel Corporation, 3GPP TSG-RAN WG4 Meeting #76, R4-154133, Aug. 24-28, 2015, 4 pages.
(Continued)

*Primary Examiner* — Omer S Mian
*Assistant Examiner* — Bao G Nguyen
(74) *Attorney, Agent, or Firm* — Sughrue Mion, PLLC

(57) ABSTRACT

A communication system is disclosed in which a base station communicates with machine-type-communication (MTC) devices by dividing the base station's cell bandwidth into (non-overlapping) narrowbands. The base station identifies, based on a communication received from a communication device, a capability of that communication device to retune between narrowbands, and provides, to that communication device, control information for controlling how that communication device retunes between different narrowbands, wherein the control information is based on the identified capability of that communication device to retune between narrowbands.

13 Claims, 10 Drawing Sheets

(51) Int. Cl.
*H04L 5/00* (2006.01)
*H04W 72/12* (2009.01)
*H04W 4/70* (2018.01)

(52) U.S. Cl.
CPC .................. *H04W 72/0413* (2013.01); *H04W 72/1284* (2013.01); *H04W 4/70* (2018.02); *H04W 72/0453* (2013.01)

(56) References Cited

U.S. PATENT DOCUMENTS

| | | |
|---|---|---|
| 2012/0210218 A1 | 8/2012 | Pendergast et al. |
| 2013/0322394 A1 | 12/2013 | Ishii et al. |
| 2015/0327249 A1* | 11/2015 | Kitazoe ............. H04W 72/0413 370/329 |
| 2016/0381490 A1* | 12/2016 | Rico Alvarino .... H04W 72/042 370/330 |
| 2017/0033843 A1* | 2/2017 | Wang ................ H04W 28/0215 |
| 2018/0367185 A1* | 12/2018 | Yi ........................ H04B 1/7143 |

FOREIGN PATENT DOCUMENTS

| | | |
|---|---|---|
| WO | 2012/104629 A2 | 8/2012 |
| WO | 2014/204202 A1 | 12/2014 |
| WO | 2016/209833 A1 | 12/2016 |

OTHER PUBLICATIONS

"Reply LS on returning time between narrowband regions for MTC", RAN4, 3GPP TSG RAN WG1 Meeting #82bis, R1-155051 (R4-155347), Oct. 5-9, 2015, 1 page.

"UL Returning", Samsung, 3GPP TSG RAN WG1 #84,R1-160541, Feb. 15-19, 2016, 3 pages.

"Frequency hopping pattern for LTE Rel-13 MTC", NEC, 3 GPP TSG RAN WG1 Meeting #83, R1-157480, Nov. 15-22, 2015, 9 pages.

"Details of Returning Symbols for FeMTC in Rel-14", NEC, 3GPP TSG-RAN WG1 Meeting #87, R1-1611717, Nov. 14-18, 2016, 2 pages.

"Returning Symbols for FeMTC in Rel-14", NEC, 3GPP TSG-RAN WG1 Meeting #86Bis, R1-1609156, Oct. 10-14, 2016, 2 pages.

"3rd Generation Partnership Project; Technical Specification Group Radio Access Network"; Study on provision of low-cost, Machine-Type Communications (MTC) User Equipments (UEs), based on LTE (Release 12), 3GPP TR 36.888 V12.0.0, Jun. 2013, 55 pages.

3rd Generation Partnership Project;Technical Specification Group Services and System Aspects; Study on architecture enhancements for Cellular Internet of Things (Release 13), 3GPP TR 23.720 V13.0.0, Mar. 2016, 94 pages.

"3rd Generation Partnership Project; Technical Specification Group Services and System Aspects"; Service requirements for Machine-Type Communications (MTC); Stage 1 (Release 13), 3GPP TS 22.368 V13.1.0, Dec. 2014, 26 pages.

"Reply LS on continuous uplink transmission in eMTC", RAN1, 3GPP TSG RAN WG1 Meeting #85, R1-166042, May 23-27, 2016, 2 pages.

United Kingdom Search Report for GB1613407.4 dated Jan. 9, 2017.

International Search Report for PCT/JP2017/027980 dated Mar. 26, 2018 [PCT/ISA/210].

Written Opinion for PCT/JP2017/027980 dated Mar. 26, 2018 [PCT/ISA/237].

Communication dated Dec. 10, 2019, issued by the Japan Patent Office in application No. 2019-505549.

Ericsson, "Introduction of LC/CE MTC", 3GPP TSG-RAN WG1 Meeting #83, Anaheim, USA, Nov. 15-22, 2015, R1-157918, 116 pages total.

\* cited by examiner

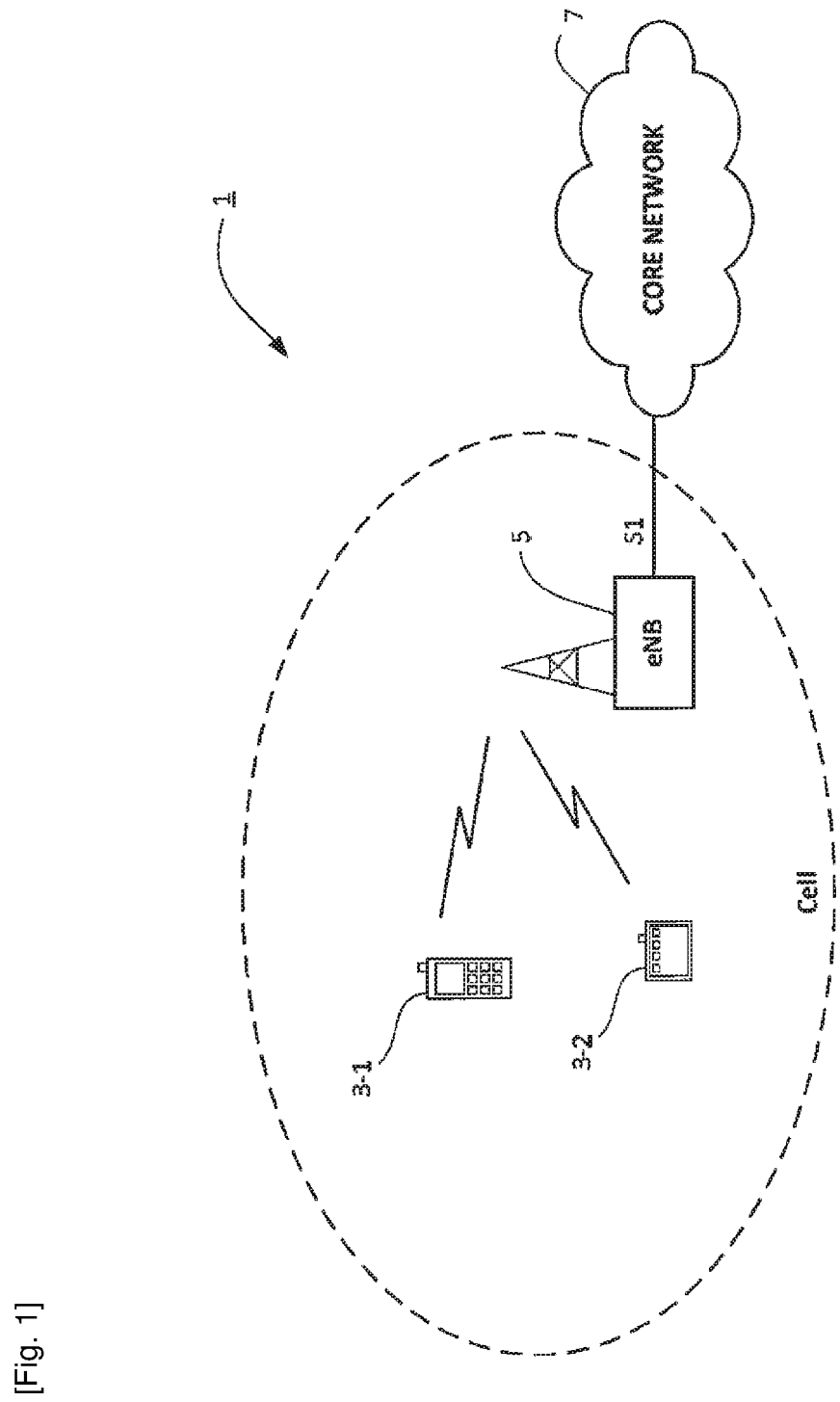
[Fig. 1]

[Fig. 2]
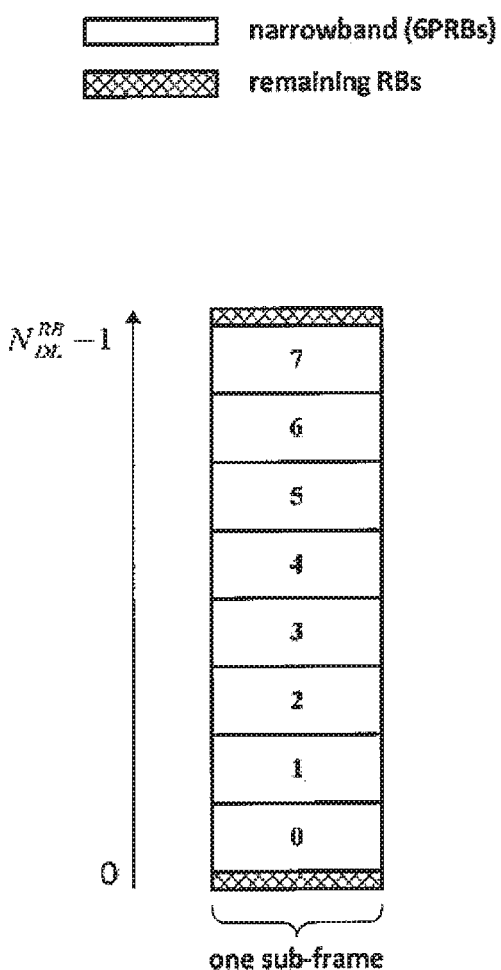

[Fig. 3]
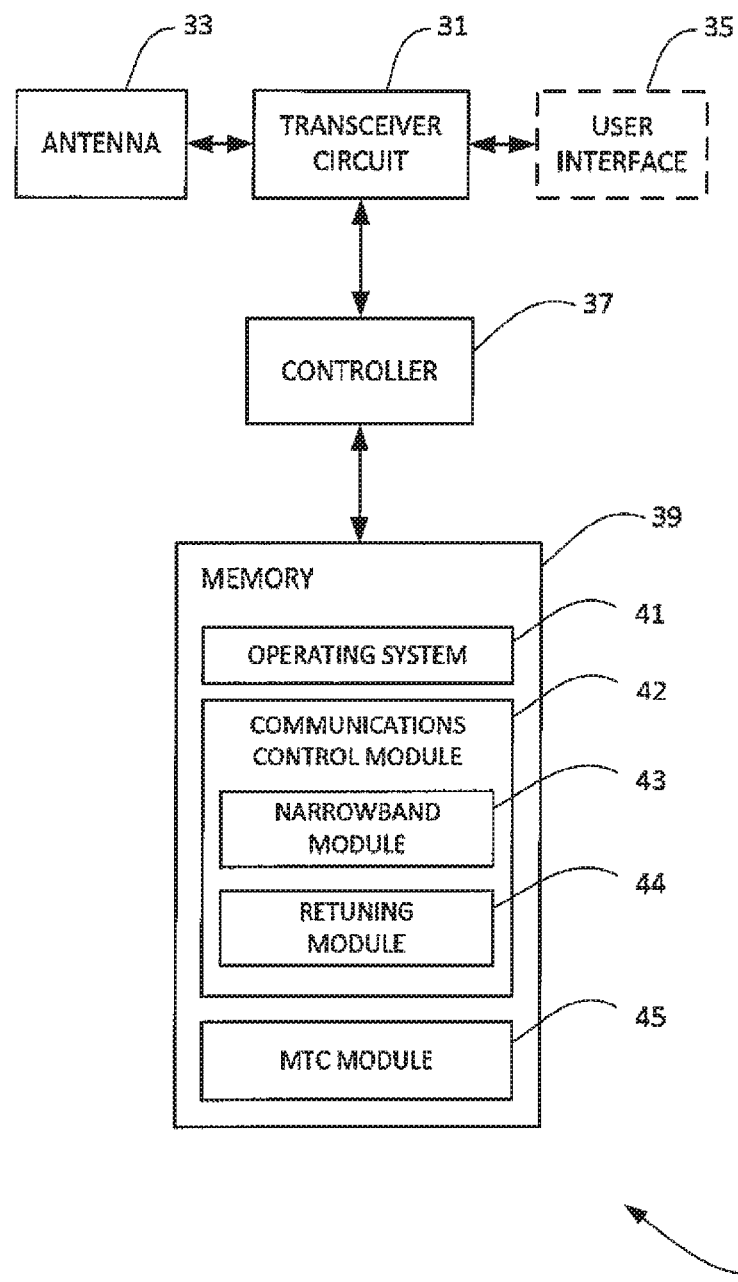

[Fig. 4]
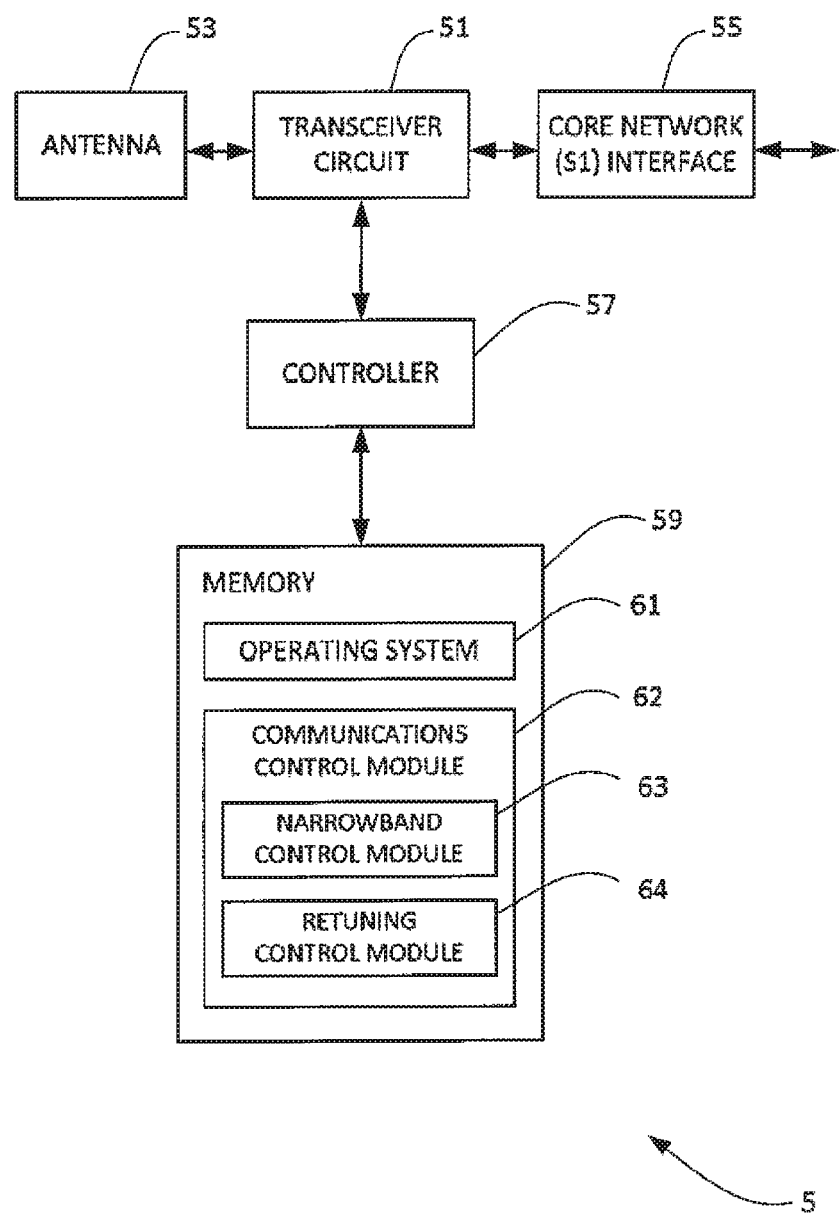

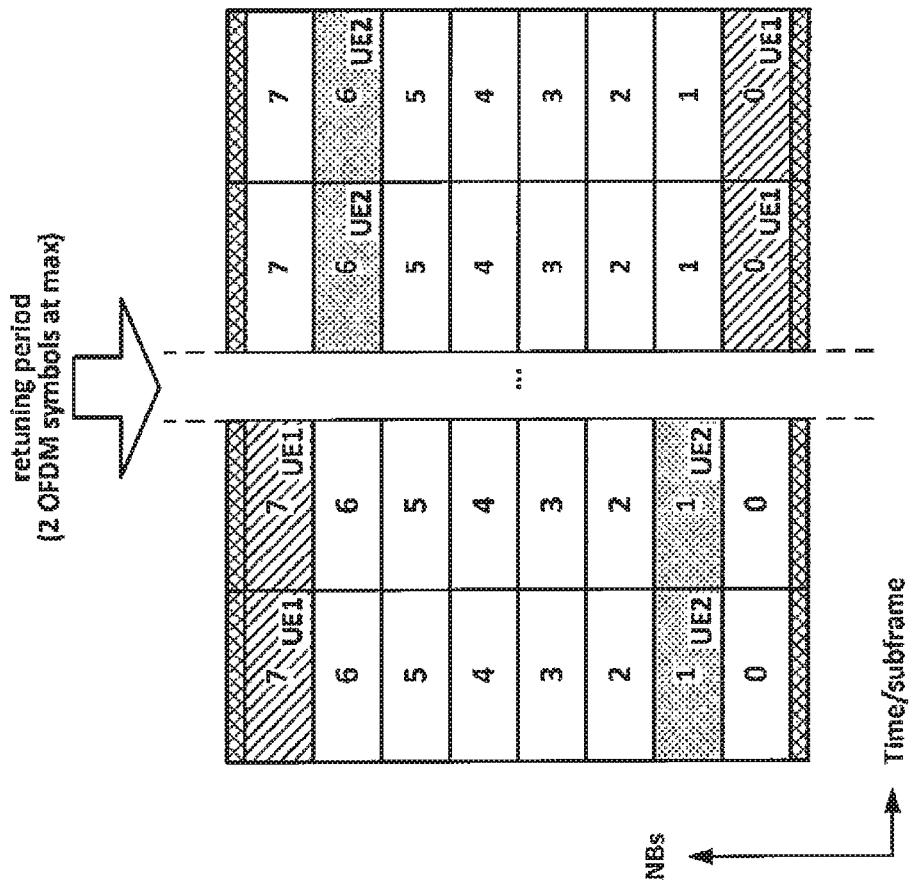
[Fig. 5]

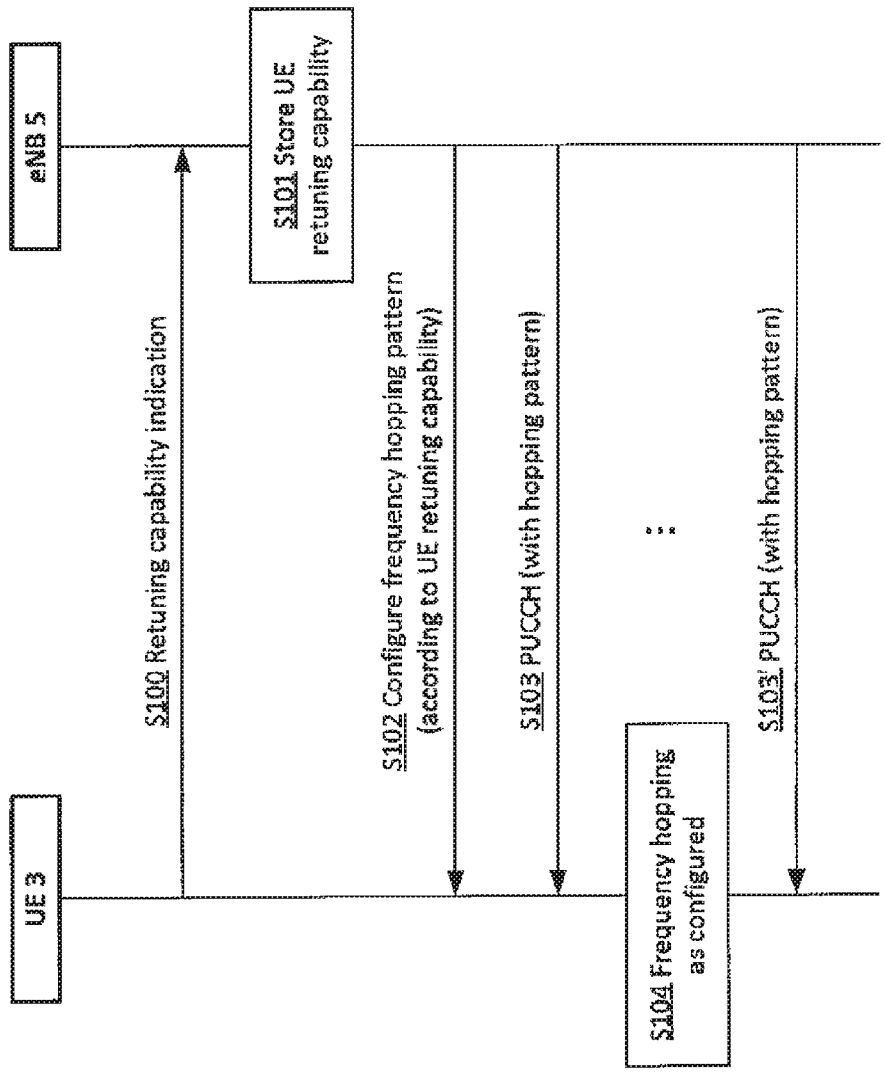
[Fig. 6]

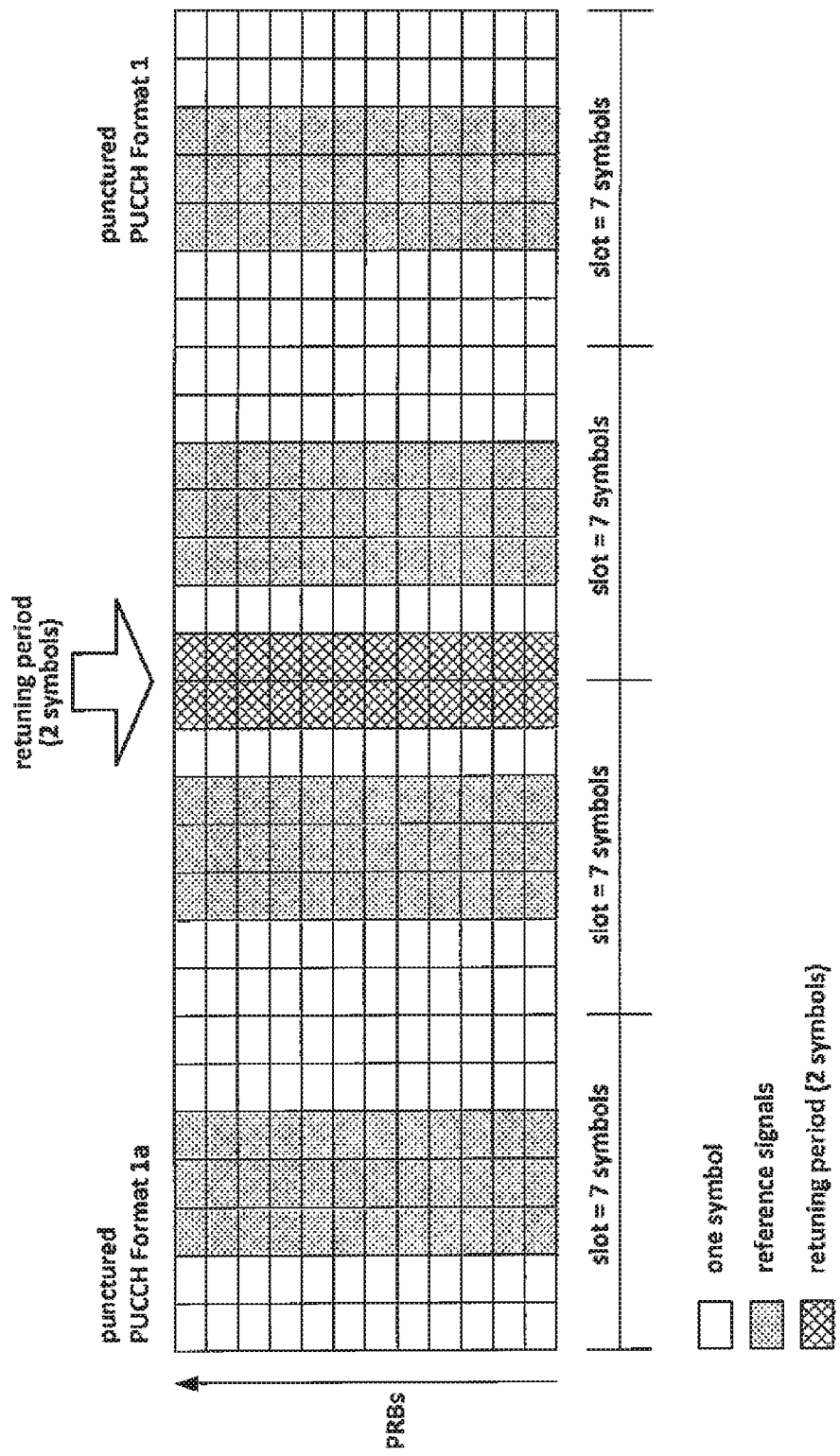
[Fig. 7]

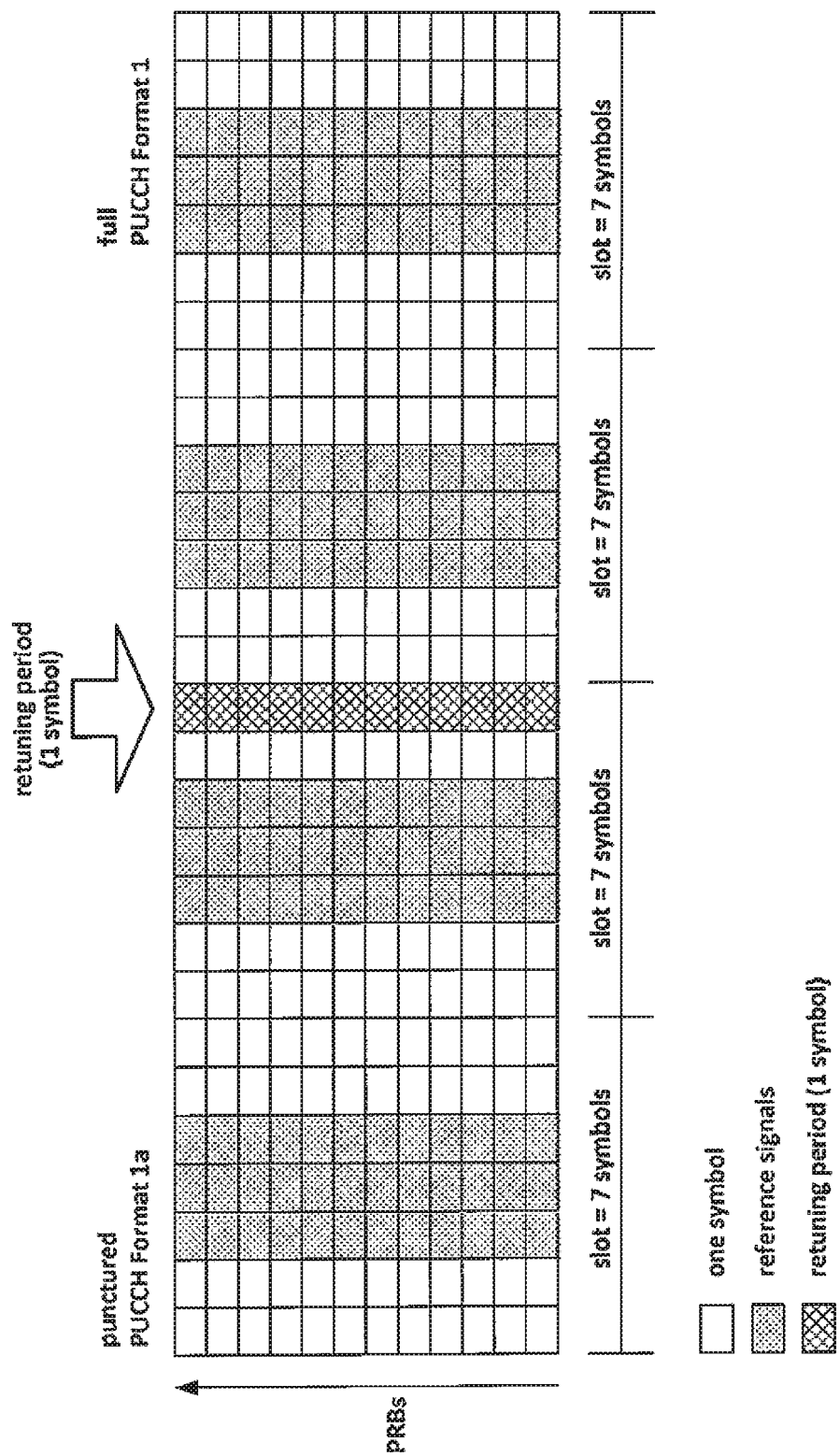

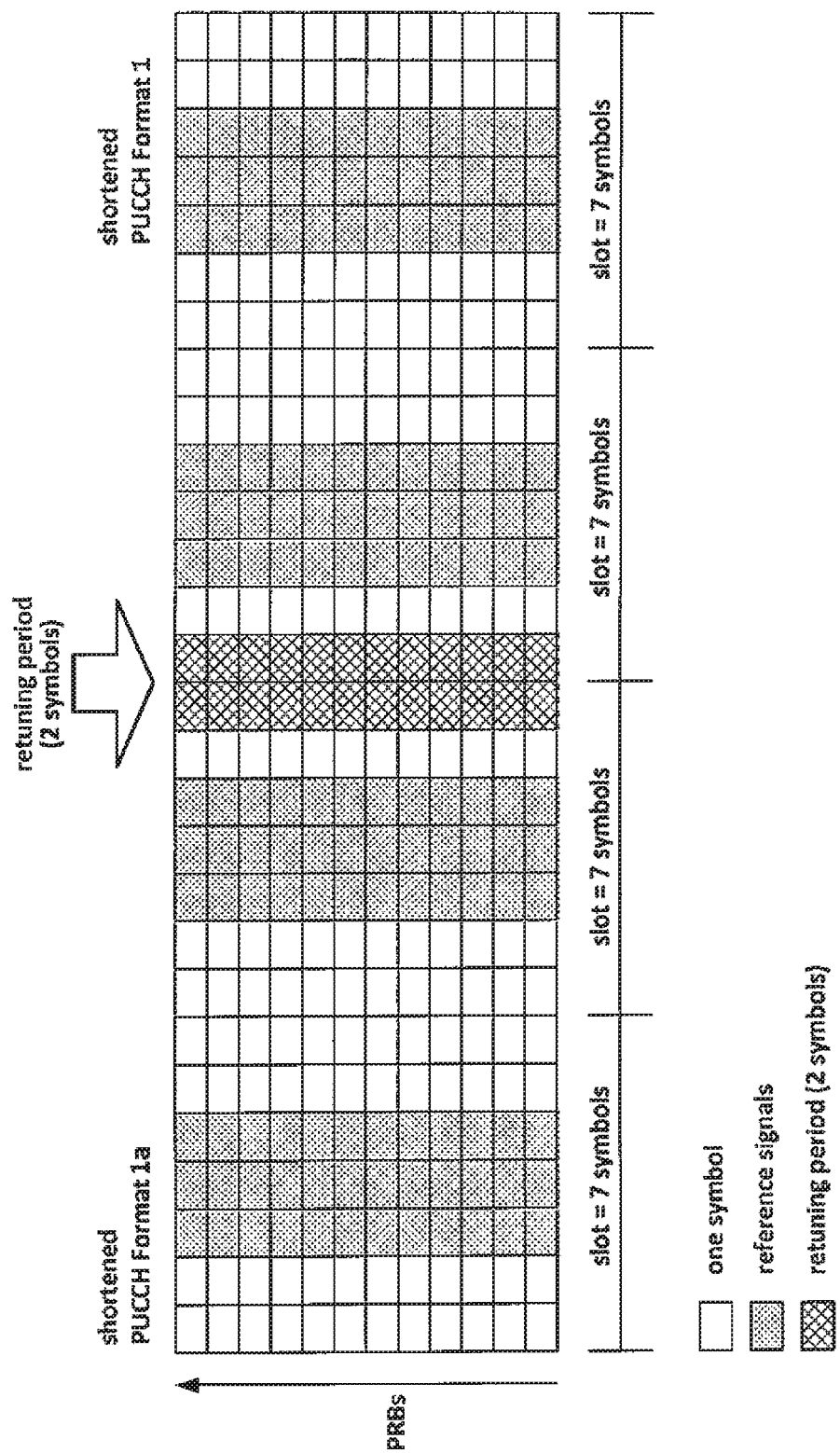
[Fig. 9]

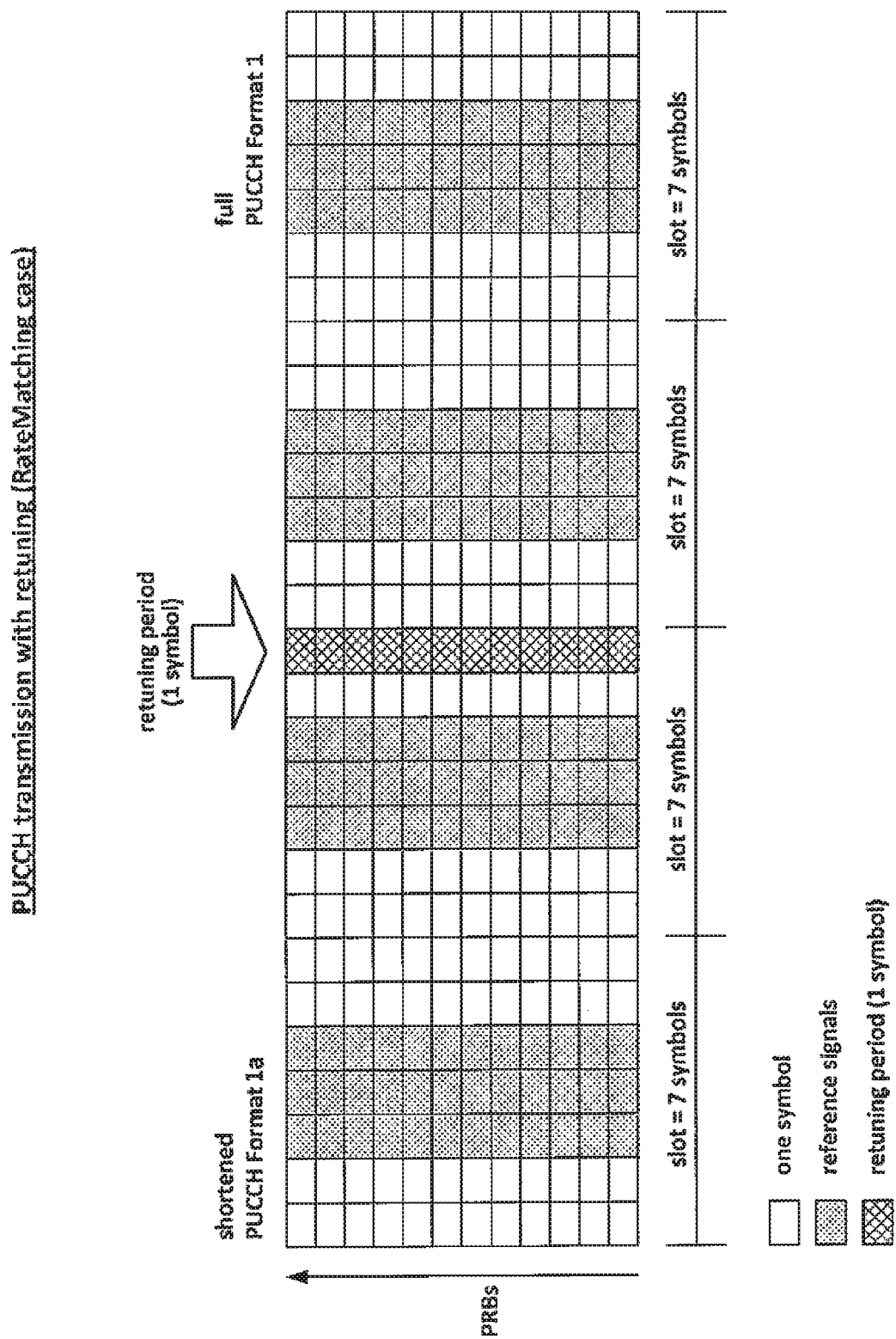
[Fig. 10]

COMMUNICATION SYSTEM

TECHNICAL FIELD

The present invention relates to mobile communications devices and networks, particularly but not exclusively those operating according to the 3rd Generation Partnership Project (3GPP) standards or equivalents or derivatives thereof. The invention has particular although not exclusive relevance to data transmissions by 'Internet of Things' devices and/or similar (narrowband) machine-type communication devices.

BACKGROUND ART

In a mobile (cellular) communications network, (user) communication devices (also known as user equipment (UE), for example mobile telephones) communicate with remote servers or with other communication devices via base stations. In their communication with each other, communication devices and base stations use licensed radio frequencies, which are typically divided into frequency bands and/or time blocks.

The latest developments of the 3GPP standards are referred to as the Long Term Evolution (LTE) of Evolved Packet Core (EPC) network and Evolved UMTS Terrestrial Radio Access Network (E-UTRAN), including LTE-Advanced. Under the 3GPP standards, a NodeB (or an eNB in LTE) is the base station via which communication devices connect to a core network and communicate to other communication devices or remote servers. For simplicity, the present application will use the term base station to refer to any such base stations. Communication devices might be, for example, mobile communication devices such as mobile telephones, smartphones, user equipment, personal digital assistants, laptop/tablet computers, web browsers, e-book readers and/or the like. Such mobile (or even generally stationary) devices are typically operated by a user.

3GPP standards also make it possible to connect so-called 'Internet of Things' (IoT) devices (e.g. Narrow-Band IoT (NB-IoT) devices) to the network, which typically comprise automated equipment, such as various measuring equipment, telemetry equipment, monitoring systems, tracking and tracing devices, in-vehicle safety systems, vehicle maintenance systems, road sensors, digital billboards, point of sale (POS) terminals, remote control systems and the like. IoT devices can be implemented as a part of a (generally) stationary apparatus such as vending machines, roadside sensors, POS terminals, although some IoT devices can be embedded in non-stationary apparatus (e.g. vehicles) or attached to animals or persons to be monitored/tracked. Effectively, the Internet of Things is a network of devices (or "things") equipped with appropriate electronics, software, sensors, network connectivity, and/or the like, which enables these devices to collect and exchange data with each other and with other communication devices. It will be appreciated that IoT devices are sometimes also referred to as Machine-Type Communication (MTC) communication devices or Machine-to-Machine (M2M) communication devices.

For simplicity, the present application refers to MTC devices in the description but it will be appreciated that the technology described can be implemented on any communication devices (mobile and/or generally stationary) that can connect to a communications network for sending/receiving data, regardless of whether such communication devices are controlled by human input or software instructions stored in memory.

MTC devices connect to the network to send data to or to receive data from a remote 'machine' (e.g. a server) or user. MTC devices use communication protocols and standards that are optimised for mobile telephones or similar user equipment. However, MTC devices, once deployed, typically operate without requiring human supervision or interaction, and follow software instructions stored in an internal memory. MTC devices might also remain stationary and/or inactive for a long period of time. The specific network requirements to support MTC (IoT) devices have been dealt with in 3GPP technical report (TR) 36.888 V 12.0.0 and 3GPP TR 23.720 V 13.0.0. Further network requirements relating to MTC devices are disclosed in the 3GPP technical specification (TS) 22.368 V 13.1.0. The contents of these 3GPP documents are incorporated herein by reference.

For the Release 13 (Rel-13) version of the 3GPP standards relating to MTC devices, support for a reduced bandwidth of 1.4 MHz in downlink and uplink is envisaged. Thus, some MTC devices (which may be referred to as 'reduced bandwidth MTC devices') will support only a limited bandwidth (typically 1.4 MHz) compared to the total LTE bandwidth. This allows such reduced bandwidth MTC devices to be made more economically (having fewer/simplified components) compared to MTC devices and other communication devices supporting a larger bandwidth and/or having more complicated components.

However, as LTE system bandwidths are typically larger than 1.4 MHz (i.e. up to 20 MHz), the system bandwidth is divided into a plurality of 'narrowbands' (or 'sub-bands'), each comprising a maximum of six physical resource blocks (PRBs), which is the maximum number of PRBs that a 1.4 MHz bandwidth limited MTC device can use in LTE.

As part of the 'enhanced' MTC (eMTC) framework, 3GPP defined such MTC specific narrowbands as follows:
the size of each narrowband is 6 PRBs;
the total number ($NB_{whole}$) of downlink (DL) narrowbands in the system bandwidth is defined as $$NB_{whole} \left\lfloor \frac{N_{RB}^{DL}}{6} \right\rfloor; \qquad \text{[Math. 1]}$$

the total number ($NB_{whole}$) of uplink (UL) narrowbands in the system bandwidth is defined as $$NB_{whole} \left\lfloor \frac{N_{RB}^{UL}}{6} \right\rfloor; \qquad \text{[Math. 2]}$$

the remaining resource blocks (that are not forming part of any narrowband) are divided evenly at both ends of the system bandwidth (i.e. as equal number of RB near the lowest frequency and near the highest frequency of the system bandwidth), with any extra odd PRB of the system bandwidth (e.g. in case of 3, 5, and 15 MHz system bandwidth) being located at the centre of the system bandwidth; and
the narrowbands are numbered in order of increasing PRB number.
Note:

$$N_{RB}^{DL} \qquad \text{[Math. 3]}$$

and $$N_{RB}^{UL} \quad \text{[Math. 4]}$$

stand for the number of PRBs in the system bandwidth (for downlink and uplink, respectively).

Since MTC devices often have simple components (especially reduced bandwidth MTC devices), their operation may also be limited. For example, the transceiver of an MTC device may not be able to perform a frequency retuning operation (i.e. tuning the transceiver from one frequency band to another) in the manner specified for conventional LTE communication devices. Specifically, as concluded in 3GPP document no. R1-155051, it is expected that for MTC devices it will take up to two Orthogonal Frequency Division Multiplexing (OFDM) symbols (also including the associated cyclic prefix (CP), assuming normal CP length), to retune their transceivers between different narrowband regions, during which retuning operation the MTC devices are unable to transmit or receive any data. Therefore, the related 3GPP requirements (in RAN4 group) are expected to be based on a maximum retuning time of two OFDM symbols for MTC devices. However, it is also expected that some MTC devices (and other UEs) may be able to perform retuning within a single OFDM symbol (including normal CP) or, if Single Carrier Frequency Division Multiple Access (SC-FDMA) is used, within a single SC-FDMA symbol.

SUMMARY OF INVENTION

Technical Problem

The inventors have realised that currently, for MTC devices, the base stations will always assume a maximum retuning time of two OFDM symbols including CP length, as defined in the eMTC framework and related standards. However, always using two symbols for retuning is not efficient and wastes valuable resources, at least for those UEs that are capable of retuning their transceivers within a single symbol. Moreover, the amount of (unused) resources reserved for allowing retuning can grow significantly with a large number of MTC devices (potentially in the order of millions of MTC devices) being deployed in an operator's network, resulting in large portions of network resources not being used, even if some/many of the MTC device are capable of fast retuning, e.g. within one symbol.

Accordingly, the present invention seeks to provide systems, devices and methods for addressing or at least alleviating these issues, whilst also meeting the above mentioned requirements for the provision of narrowbands.

Solution to Problem

In one aspect, the invention provides a base station for a communication system, wherein the base station comprises: a controller for operating a cell having a cell bandwidth comprising a plurality of narrowbands each narrowband having a respective index for identifying that narrowband; and a transceiver for communicating with a plurality of communication devices within the cell; wherein the controller is operable to: identify based on a communication received, from a communication device, a capability of that communication device to retune between narrowbands; and provide, to that communication device, control information for controlling how that communication device retunes between different narrowbands, wherein the control information is based on the identified capability of that communication device to retune between narrowbands.

In another aspect, the invention provides a communication device for communicating within a cell operated by a base station and having an associated cell bandwidth comprising a plurality of narrowbands each narrowband having a respective index for identifying that narrowband, the communication device comprising: a transceiver operable to: send, to the base station, a communication identifying a capability of the transceiver to retune between narrowbands; and receive, from the base station, control information for controlling how the communication device retunes between different narrowbands, wherein the control information is based on the identified capability of the communication device to retune between narrowbands; and a controller for controlling the transceiver when communicating data, with the base station, in accordance with the received control information.

Aspects of the invention extend to corresponding systems, methods, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

Example embodiments of the invention will now be described by way of example only with reference to the attached figures in which:

BRIEF DESCRIPTION OF DRAWINGS

FIG. 1 schematically illustrates a telecommunication system to which example embodiments of the invention may be applied;

FIG. 2 illustrates an exemplary way in which MTC device compatible narrowbands may be provided in the system shown in FIG. 1;

FIG. 3 is a block diagram illustrating the main components of the communication device shown in FIG. 1;

FIG. 4 is a block diagram illustrating the main components of the base station shown in FIG. 1;

FIG. 5 schematically illustrates a retuning operation for MTC devices in the system shown in FIG. 1;

FIG. 6 is an exemplary timing (signalling) diagram illustrating a procedure followed by the MTC device and the base station according to an example embodiment of the invention;

FIG. 7 illustrates an exemplary way in which a retuning period can be realised for MTC devices in the system shown in FIG. 1;

FIG. 8 illustrates an exemplary way in which a retuning period can be realised for MTC devices in the system shown in FIG. 1;

FIG. 9 illustrates an exemplary way in which a retuning period can be realised for MTC devices in the system shown in FIG. 1;

FIG. 10 illustrates an exemplary way in which a retuning period can be realised for MTC devices in the system shown in FIG. 1.

DESCRIPTION OF EMBODIMENTS

Overview

FIG. 1 schematically illustrates a mobile (cellular) telecommunication system 1 in which communication devices 3 (such as mobile telephone 3-1 and MTC device 3-2) can communicate with each other and/or with other communication nodes via an E-UTRAN base station 5 (denoted 'eNB') and a core network 7. As those skilled in the art will appreciate, whilst one mobile telephone 3-1, one MTC device 3-2, and one base station 5 are shown in FIG. 1 for illustration purposes, the system, when implemented, will typically include other base stations and communication devices.

The base station 5 is connected to the core network 7 via an S1 interface. Although omitted from FIG. 1 for sake of simplicity, the core network 7 includes, amongst others: a gateway for connecting to other networks, such as the Internet and/or to servers hosted outside the core network 7; a mobility management entity (MME) for keeping track of the locations of the communication devices 3 (e.g. the mobile telephone and the MTC device) within the communication network 1; and a home subscriber server (HSS) for storing subscription related information (e.g. information identifying which communication device 3 is configured as a machine-type communication device) and for storing control parameters specific for each communication device 3.

The base station 5 is configured to provide a number of control channels, including, for example, a physical downlink control channel (PDCCH) and a physical uplink control channel (PUCCH). The PDCCH is used by the base station 5 for allocating resources to the communication devices 3 (typically by sending respective UE-specific downlink control information (DCI) to each communication device that has been scheduled in the current scheduling round). The PUCCH is used by the communication devices 3 for sending UE-specific uplink control information (UCI) to the base station (e.g. an appropriate HARQ Ack/Nack feedback corresponding to downlink data received using the resources allocated by a DCI).

In order to support such reduced bandwidth MTC devices in its cell, the system bandwidth of the base station 5 of FIG. 1 is divided into a plurality of non-overlapping narrowbands. The narrowbands within the system bandwidth are allocated such that it is possible to maintain efficient resource allocation signalling for the narrowbands for Rel-13 low complexity MTC UEs.

As shown in FIG. 2, each narrowband comprises six resource blocks, and there are some remaining resource blocks (less than six resource blocks) that are distributed evenly at the edges of the frequency bandwidth. The system bandwidth comprises a total of $$N_{RB}^{DL} \text{ PRBs,} \quad \text{[Math. 5]}$$

each PRB having a respective associated resource block index in the range $$\text{'0' to 'N}_{RB}^{DL}-1\text{'.} \quad \text{[Math. 6]}$$

In this example, there are a total of eight narrowbands, each having a respective associated index between '0' and '7', numbered in order of increasing PRB number.

Specifically, the total number of narrowbands in the system bandwidth is defined using the following formula:

$$NB_{whole} \left\lfloor \frac{N_{RB}^{DL}}{6} \right\rfloor \quad \text{[Math. 7]}$$

where $NB_{whole}$ is the total number of 1.4 MHz narrowbands in the system bandwidth (each narrowband consisting of 6 PRBs);

$$N_{RB}^{DL} \quad \text{[Math. 8]}$$

is the total number of downlink (DL) resource blocks in the system bandwidth; and $$\lfloor x \rfloor \quad \text{[Math. 9]}$$

is a flooring function (i.e. the largest integer not greater than 'x').

In this example, the (downlink) system bandwidth in the cell of the base station 5 is fifty PRBs $$(N_{RB}^{DL}=50), \quad \text{[Math. 10]}$$

which corresponds to approximately 10 MHz of frequency bandwidth. Each narrowband comprises six PRBs (i.e. the maximum number of PRBs that a bandwidth limited MTC device is capable of using). It follows therefore that a maximum of eight whole narrowbands can be provided (i.e. $NB_{whole}=8$) which occupy a total of 48 PRBs of the system bandwidth. In addition, the remaining resource blocks are divided into two 'partial narrowbands' each comprising one PRB (at the edges of the system bandwidth). It will be appreciated that, if appropriate, these remaining resource blocks may also be allocated to compatible MTC devices (or other user equipment). Alternatively, the remaining resource blocks may be allocated for use by other UEs (e.g. for non-MTC use) and/or for transmitting control data.

Beneficially, the narrowbands index numbers facilitate efficient assignment of the narrowbands to MTC devices. In this example, the indexing is arranged in order of increasing PRB number. Although not shown in FIG. 2, it will be appreciated that the partial narrowbands may also be provided with their own respective index numbers.

Returning now to FIG. 1, each communication device 3 may fall into one or more of categories of UEs. A first category of UEs include conventional (i.e. non-MTC) communication devices, such as mobile telephones, that are capable of communicating over the entire bandwidth available in the cell of the base station 5. A second category of UEs include reduced bandwidth UEs (e.g. Rel-13 MTC devices capable of using a 1.4 MHz bandwidth only), which are not able to communicate over the entire bandwidth available in the cell of the base station 5. UEs in the second category may be able to perform a retuning operation within a maximum period of two OFDM symbols. A third category of UEs includes reduced bandwidth UEs (e.g. some MTC devices/mobile telephones provided with MTC functionality), which are configured to communicate using a 1.4 MHz bandwidth only but which are able to perform a retuning operation within a maximum period of one OFDM symbol.

In this example, the mobile telephone 3-1 falls into the first category of UEs, and it may also fall into the third category of UEs (e.g. when running an MTC application). Therefore, the mobile telephone 3-1 is either able to use the entire system bandwidth at once (without any retuning required) or it is able to perform a retuning operation (between different narrowbands) within a single OFDM symbol. On the other hand, the MTC device 3-2 falls into the second category of UEs, and it is able to perform a retuning operation within a maximum period of two OFDM symbols.

Beneficially, the communication devices 3 in this system are configured to notify the base station 5 about their retuning capability (i.e. whether they are capable of retuning between narrowbands within 1 or 2 symbols).

In one option, each communication device 3 is configured to inform the base station 5 about its retuning capability using radio resource control (RRC) signalling. For example, each communication device may include appropriate information (e.g. a 1 bit indication/information element/flag) in an RRC signalling message sent to the base station 5. It will be appreciated that such retuning capability information may be added to any suitable RRC message, such as an appropriately formatted RRC connection (re)configuration request and/or messages relating to a random access procedure (for example, message #3 or #5 of the random access procedure).

In another option, the retuning capability information (1 bit indication/flag) may be added to a message of the Feature Group Indicator (FGI) signalling procedure.

In yet another option, it is possible to reuse existing signalling information (e.g. a suitable UE capability signalling normally associated with MTC devices) for the purpose of indicating a particular retuning capability. In other words, retuning capability information may be provided jointly with another UE (MTC) capability information. Specifically, it will be appreciated that the existing "UL Transmission Gaps for long uplink transmissions" information element (IE), which is specific to MTC devices, may be used to indicate whether the sending communication device 3 is able to perform retuning within a single symbol (including normal CP). In this case, when a particular communication device 3 indicates to the base station 5 that it needs UL transmission gaps for long uplink transmissions (by sending an appropriately formatted "UL Transmission Gaps for long uplink transmissions" IE), the base station 5 may be configured to interpret this information element to also mean that the sending communication device 3 is capable of retuning within two symbols. Otherwise, the base station 5 may be configured to assume that the sending communication device 3 (which does not need UL transmission gaps for long uplink transmissions) is capable of retuning within one symbol.

Regardless of which option is followed, the received retuning capability information may be interpreted by the base station 5 as a simple on/off type indication (e.g. meaning that the sending UE requires a retuning period of two symbols when the 1 bit indication/flag is set to a certain value and that the sending UE requires a retuning period of one symbol when the 1 bit indication/flag is set to its other value). For example, communication devices 3 which fall into the first or third category of UEs (or both) may be configured to set the 1 bit indication/flag to the value '1'/'ON' and communication devices 3 which fall into the second category of UEs may be configured to set the 1 bit indication/flag to '0'/'OFF' (or vice versa).

Therefore, the base station 5 may be configured to interpret the received indication/flag as follows:
'1' or 'ON': this particular UE has a transceiver that is capable of retuning between narrowbands within a single symbol (including CP); and '0' or 'OFF': this particular UE has a transceiver that is capable of retuning between narrowbands within two symbols (including CP).

In a particularly beneficial example, the base station 5 may be configured to maintain separate (dedicated) PRACH resources for communication devices 3 that belong to the first or third category of UEs (MTC devices and other user equipment that are capable of retuning within a single symbol). Therefore, any communication device that is capable of retuning within one OFDM symbol may be configured to transmit PRACH using such separate PRACH resources which would indicate (implicitly) to the base station 5 that the sending UE is capable of retuning within one OFDM symbol. Similarly, MTC devices 3 that belong to the second category of UEs (e.g. less advanced MTC devices) may be configured to use regular (or MTC specific) PRACH resources (if they cannot or do not wish to benefit from fast retuning). Thus, any communication device 3 can indicate (implicitly) to the base station 5, by using appropriate PRACH resources, whether that communication device 3 is capable of retuning within one symbol or within two symbols.

Once a particular communication device indicated its retuning capability to the base station, the base station can beneficially allocate an appropriate frequency hopping (mirroring) pattern to that communication device, taking into account whether the communication device is capable of retuning within one or two OFDM symbols. Accordingly, it is possible to avoid or at least reduce wastage of resources for MTC devices (and other user equipment) that are capable of fast retuning (e.g. within a single OFDM symbol) and still benefit from frequency diversity and associated improvements (e.g. improved throughput and/or reduced interference) that can be achieved when employing frequency hopping/mirroring.

Beneficially, significant resource savings may also be achieved for transmissions via the Physical Uplink Shared Channel (PUSCH) and related operations at the base station. It will be appreciated that the amount of PUSCH resource saving depends on the frequency hopping periodicity (i.e. how often a particular communication device needs to hop between narrowbands). If the communication device is capable of retuning within one symbol and the frequency hopping period is set to one sub-fame (i.e. Ych=1), then a resource saving of 8.6% can be achieved (for normal CP length) in every PRB (i.e. $^{11}/_{12}$ vs. $^{10}/_{12}$ symbols can be used, excluding 2 symbols for RS). Beneficially, the PUSCH resource saving scales up depending on how many PRBs are allocated in a sub-frame for the communication device. Furthermore, due to less puncturing for the PUSCH, the performance of PUSCH decoding will also be improved at the base station.

In summary, therefore, it can be seen that in the telecommunication system the serving base station is beneficially able to determine and hence know whether a particular UE/MTC device can perform retuning within a single OFDM/SC-FDMA symbol (including CP length), at least for uplink transmissions, or within two OFDM symbols. Hence, as a result of this ability to know whether or not a given UE/MTC device can perform retuning within a single OFDM/SC-FDMA symbol (including CP length), significant resource savings can be achieved.

Communication Device

FIG. 3 is a block diagram illustrating the main components of the communication device 3 shown in FIG. 1. The communication device 3 may be an MTC device or a mobile (or 'cellular') telephone configured as a machine-type communication device. The communication device 3 comprises a transceiver circuit 31 which is operable to transmit signals to, and to receive signals from, the base station 5 via at least one antenna 33. Typically, the communication device 3 also includes a user interface 35 which allows a user to interact with the communication device 3; however this user interface 35 may be omitted for some MTC devices.

The operation of the transceiver circuit 31 is controlled by a controller 37 in accordance with software stored in a memory 39. The software includes, among other things, an operating system 41, a communications control module 42, and an MTC module 45.

The communications control module 42 controls communications between the communication device 3 and the base station 5 and/or other communication nodes (via the base station 5). As shown in FIG. 3, the communication control module 42 includes, amongst others, a narrowband communication module 43 and a retuning module 44.

The MTC module 45 is operable to carry out machine-type communication tasks. For example, the MTC module 45 may (e.g. periodically) receive data from a remote server (via the transceiver circuit 31) over resources allocated to the MTC device 3 by the base station 5. The MTC module 45 may also collect data for sending (e.g. periodically and/or upon detecting a trigger) to a remote server (via the transceiver circuit 31).

Base Station

FIG. 4 is a block diagram illustrating the main components of the base station 5 shown in FIG. 1. The base station 5 comprises an E-UTRAN base station (eNB) comprising a transceiver circuit 51 which is operable to transmit signals to, and to receive signals from, the communication devices 3 via one or more antennas 53. The base station 5 is also operable to transmit signals to and to receive signals from the core network 7 via an appropriate core network interface 55 (such as an S1 interface).

The operation of the transceiver circuit 51 is controlled by a controller 57 in accordance with software stored in a memory 59. The software includes, among other things, an operating system 61 and a communications control module 62.

The communications control module 62 controls communications with the communication devices 3 (including any MTC devices). The communications control module 62 is also responsible for scheduling the resources to be used by the communication devices 3 served by this base station 5. As shown in FIG. 4, the communications control module 62 includes, amongst others, a narrowband control module 63 and a retuning control module 64.

In the above description, the communication device 3 and the base station 5 are described for ease of understanding as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

The following is a description of various ways in which MTC devices may perform a retuning operation in LTE systems.

Operation

FIG. 5 schematically illustrates an exemplary retuning operation for communication devices in the system shown in FIG. 1.

As shown, in this example UE1 (e.g. communication device 3-1) has been initially assigned to narrowband #7 (e.g. for the duration of two sub-frames), then it has to hop to narrowband #0 (e.g. for two sub-frames). The same applies to UE2 (e.g. communication device 3-2) as well, which is initially assigned to narrowband #1, then hops to narrowband #6. This process is also referred to as frequency mirroring, in which the frequency (narrowband) used by each communication device is regularly 'mirrored' around a (virtual) central line of the system bandwidth. Beneficially, such mirroring of the assigned narrowbands improves frequency diversity for the communication devices and hence contributes to improved system throughput.

In the example shown in FIG. 5 the maximum retuning time between consecutive narrowband regions is 2 OFDM symbols including CP length (i.e. the space between the dashed lines). However, as explained below, this retuning time may be different for different communication devices 3, depending on their retuning capability.

FIG. 6 is an exemplary timing (signalling) diagram illustrating procedures relating to signalling retuning capability of an MTC device 3 to the base station 5, and employing an appropriate frequency hopping (mirroring) pattern for transmissions between that MTC device 3 and the base station 5.

As can be seen, the procedure begins when the MTC device 3 (denoted 'UE' in FIG. 6) indicates its retuning capability to the base station 5. This is generally illustrated in step S100.

As described above, there are several options for the MTC device 3 to inform the base station 5 (either explicitly or implicitly) about its retuning capability.

Option A: UE Capability Signalling Via RRC

In this option, the communication device 3 informs the base station 5 about its retuning capability by generating and sending, in step S100, an RRC signalling message to the base station 5. For example, the MTC module 45 may be configured to check the retuning capability (stored in e.g. the retuning module 44) and provide this information to the communications control module 42 for generating an appropriately formatted RRC message.

The communication device 3 (using its communications control module 42) may include appropriate information (e.g. a 1 bit indication/information element/flag) in the RRC signalling message. It will be appreciated that such retuning capability information may be added to any suitable RRC message, such as an appropriately formatted RRC connection (re)configuration request and/or the like.

The retuning capability information may comprise a 1-bit indication/flag (as part of the generated RRC message) for informing the base station 5 whether or not the communication device 3 is capable of retuning within a single symbol (including CP). In other words, the communication device 3 is able to instruct the base station 5 whether to turn on (or turn off) retuning within a single symbol (at least for this particular communication device 3).

For example, the communication device 3 may be configured to provide RRC signalling including one of the following values (in an appropriate 1 bit indication/information element/flag):

ON (or '1'): the communication device 3 is capable of performing a retuning operation within a single symbol (including CP); and OFF (or '0'): the communication device 3 is not capable of performing a retuning operation within a single symbol; it is capable of retuning within two symbols (including CP).

Option B: Reusing Existing Signalling Information

Typically, UEs that are able to perform retuning within a single symbol (including normal CP) include UEs/MTC devices that have more advanced hardware, such as XTAL oscillators, compared to less expensive crystal oscillators (TCXO). 3GPP document no. R1-166042 suggested a new UE capability signalling called "UL Transmission Gaps for long uplink transmissions" for providing a gap period for the UE in its uplink transmission during which gap period the UE can switch to downlink reception. The UE may need to switch to downlink reception (at least temporarily) from uplink transmission for monitoring DL reference signals (RS) and synchronization signals (PSS/SSS) in order to estimate and correct the timing synchronization and frequency offset (before continuing its uplink transmissions). It will be appreciated that UEs which do not need UL transmission gaps for long uplink transmissions are those with advanced hardware such as expensive XTAL oscillators and hence they are also likely to be able to perform retuning within a single symbol (including normal CP).

Therefore, in this option, the communication device 3 and the base station 5 are configured to reuse the existing signalling information (e.g. "UL Transmission Gaps for long uplink transmissions" and/or the like) for the purpose of indicating the retuning capability of the communication device 3. It is possible to combine the UE retuning capability indication with the existing "UL Transmission Gaps for long uplink transmissions" IE (rather than providing a separate UE retuning capability indication).

Accordingly, if the communication device 3 is able to perform retuning within two symbols (including normal CP), then the communication device 3 generates and sends, in step S100, an appropriately formatted "UL Transmission Gaps for long uplink transmissions" IE to the base station 5. In this case, the value of the "UL Transmission Gaps for long uplink transmissions" IE is set by the communication device 3 as follows:

OFF (or '0'): the communication device 3 does not need transmission gaps for long uplink transmissions and the communication device 3 is capable of performing a retuning operation within a single symbol (including CP); or ON (or '1'): the communication device 3 needs transmission gaps for long uplink transmissions and the communication device 3 is capable of retuning within two symbols (including CP).

Option C: Other Types of Capability Signalling

The communication device 3 may inform the base station 5 about its retuning capability by generating and sending, in step S100, an appropriately formatted random access message. In this case, the communication device 3 (using its communications control module 42) may include retuning capability information (e.g. a 1 bit indication/information element/flag) in message #3 or message #5 of the random access procedure.

It will be appreciated that the retuning capability information (1 bit indication/flag) may also be added to a message sent as part of the FGI signalling procedure.

Thus, the communication device 3 may be configured to generate and send, to the base station 5, random access and/or FGI signalling including one of the following values (in an appropriate 1 bit indication/information element/flag):

ON (or '1'): the communication device 3 is capable of performing a retuning operation within a single symbol (including CP); and OFF (or '0'): the communication device 3 is not capable of performing a retuning operation within a single symbol; it is capable of retuning within two symbols (including CP).

Option D: Separate Resources for PRACH (Implicit Capability Signalling

The base station 5 may be configured to maintain separate (dedicated) PRACH resources for MTC devices 3 that are capable of retuning within a single OFDM/SC-FDMA symbol (including CP). These resources can be signalled to the communication devices 3 in the system information block (SIB) information broadcast by the base station 5 (not shown in FIG. 6). Therefore, if the communication device 3 is capable of retuning within a single symbol, then it transmits, in step S100, its PRACH signalling using such pre-allocated resources, thereby informing the base station 5 that the communication device 3 is capable of retuning within a single OFDM/SC-FDMA symbol (including CP). Similarly, if the communication device 3 is capable of retuning within two symbols, then it transmits, in step S100, its PRACH signalling using other than such pre-allocated resources, which would be interpreted by the base station 5 that this communication device 3 is capable of retuning within two OFDM/SC-FDMA symbols (including CP).

Returning now to FIG. 6, after the communication device 3 sends its retuning capability indication to the base station 5, the procedure continues with step S101, in which the base station 5 stores (in its retuning control module 64) and applies (using its narrowband control module 63) the retuning capability for subsequent communications with the communication device 3.

As generally shown in step S102, the base station 5 applies an appropriate (retuning capability dependent) frequency hopping pattern for the mobile communication device 3. For example, the base station 5 may configure an appropriate frequency hopping pattern for the PUCCH transmissions for the communication device 3 (i.e. the hopping pattern reserving a single OFDM symbol after each frequency hop for the communication device 3 if the communication device indicated that it is capable of retuning within a single OFDM symbol; or the hopping pattern reserving two OFDM symbols after each frequency hop if the communication device indicated that it is capable of retuning within two OFDM symbols).

The communication device 3 stores the received frequency hopping pattern in its retuning module 44, and starts monitoring for PUCCH transmissions by the base station 5. As generally shown in steps S103 and S103', the base station 5 carries out PUCCH transmissions with the configured frequency hopping pattern (with either one or two OFDM symbols allowed for retuning after each hop).

The communication device 3 (using its retuning module 44) performs frequency hopping between different narrowbands as configured via the signalling message in step S102, and monitors for PUCCH transmissions, in each sub-frame, in the narrowband appropriate for that sub-frame.

PUCCH Retuning

FIGS. 7 to 10 illustrate exemplary ways in which an appropriate retuning period can be realised for MTC devices 3 in the system shown in FIG. 1.

It will be appreciated that the so-called puncturing technique may be adapted for facilitating PUCCH retuning for communication devices. In this case, as shown in FIG. 7, two symbols may be provided for retuning, e.g. by transmitting a punctured PUCCH Format 1a control information followed by a punctured PUCCH Format 1 control information with two punctured OFDM symbols therebetween (the first punctured OFDM symbol being the last symbol of the PUCCH Format 1a and the second punctured OFDM symbol being the first symbol of the PUCCH Format 1). Although this type of transmission may degrade PUCCH performance (since the cover codes are no longer orthogonal due to the puncturing), it still allows MTC devices in the second UE category to perform retuning (within the retuning period represented by the two punctured symbols).

As shown in FIG. 8, puncturing may also be used to provide a retuning period of a single symbol (at least for compatible communication devices). In this case, a PUCCH Format 1a control information (with its last symbol being punctured) is followed by a full PUCCH Format 1 transmission. This arrangement improves PUCCH performance (compared to the arrangement shown in FIG. 7) as there is no orthogonality loss at the second sub-frame.

FIGS. 9 and 10 illustrate PUCCH transmission and retuning by employing 'RateMatching'.

In FIG. 9, two symbols are used for retuning. This is achieved by transmitting a shortened PUCCH Format 1a control information followed by a shortened PUCCH Format 1 control information (each of which shortened by one OFDM symbol thus effectively resulting in a combined retuning period of two OFDM symbols). As can be seen, the first symbol of the retuning period is the OFDM symbol immediately following the last symbol of the shortened PUCCH Format 1a and the second symbol of the retuning period is the OFDM symbol immediately preceding the shortened PUCCH Format 1. Whilst this arrangement may degrade PUCCH performance (since in some cases the cover codes are no longer orthogonal, e.g. between SF=4 and SF=3 for different users), it still allows MTC devices in the second UE category to perform retuning (within the retuning period of two OFDM symbols).

As shown in FIG. 10, RateMatching may also be used to provide a retuning period of a single symbol (at least for compatible communication devices). In this case, a shortened PUCCH Format 1a control information is followed by a full PUCCH Format 1 transmission after a retuning period of one symbol. This arrangement improves PUCCH performance (compared to the arrangement shown in FIG. 9) as there is no orthogonality loss at the second sub-frame.

Modifications and Alternatives

Detailed example embodiments have been described above. As those skilled in the art will appreciate, a number of modifications and alternatives can be made to the above example embodiments whilst still benefiting from the inventions embodied therein.

It will be appreciated that although the above example embodiments have been described using the term 'narrowband' when referring to a portion of the system bandwidth, the term 'sub-band' may also be used. Accordingly, the term narrowband and sub-band have the same meaning and can be used interchangeably.

It will be appreciated that although the communication system is described in terms of the base station operating as a E-UTRAN base station (eNB), the same principles may be applied to base stations operating as macro or pico base stations, femto base stations, relay nodes providing elements of base station functionality, home base stations (HeNB), or other such communication nodes.

In the above example embodiments, an LTE telecommunications system was described. As those skilled in the art will appreciate, the techniques described in the present application can be employed in other communications systems, including earlier 3GPP type systems. Other communications nodes or devices may include user devices such as, for example, personal digital assistants, laptop computers, web browsers, etc.

In the example embodiments described above, the base station and the communication device each include transceiver circuitry. Typically, this circuitry will be formed by dedicated hardware circuits. However, in some example embodiments, part of the transceiver circuitry may be implemented as software run by the corresponding controller.

In the above example embodiments, a number of software modules were described. As those skilled in the art will appreciate, the software modules may be provided in compiled or un-compiled form and may be supplied to the base station or the communication device as a signal over a computer network, or on a recording medium. Further, the functionality performed by part or all of this software may be performed using one or more dedicated hardware circuits.

In the above example embodiments, machine-type communication devices and mobile telephones are described. However, it will be appreciated that mobile telephones (and similar user equipment) may also be configured to operate as machine-type communication devices. For example, the mobile telephone 3-1 may include (and/or provide the functionality of) the MTC module 45.

Examples of MTC Applications

It will be appreciated that each communication device may support one or more MTC applications. Some examples of MTC applications are listed in the following table (source: 3GPP TS 22.368 V 13.1.0, Annex B). This list is not exhaustive and is intended to be indicative of the scope of machine-type communication applications.

TABLE 1

| Service Area | MTC applications |
| --- | --- |
| Security | Surveillance systems |
|  | Backup for landline |
|  | Control of physical access (e.g. to buildings) |
|  | Car/driver security |
| Tracking & Tracing | Fleet Management |
|  | Order Management |
|  | Pay as you drive |
|  | Asset Tracking |
|  | Navigation |
|  | Traffic information |
|  | Road tolling |
|  | Road traffic optimisation/steering |
| Payment | Point of sales |
|  | Vending machines |
|  | Gaming machines |
| Health | Monitoring vital signs |
|  | Supporting the aged or handicapped |
|  | Web Access Telemedicine points |
|  | Remote diagnostics |
| Remote Maintenance/Control | Sensors |
|  | Lighting |
|  | Pumps |
|  | Valves |
|  | Elevator control |
|  | Vending machine control |
|  | Vehicle diagnostics |

TABLE 1-continued

| Service Area | MTC applications |
| --- | --- |
| Metering | Power |
| | Gas |
| | Water |
| | Heating |
| | Grid control |
| | Industrial metering |
| Consumer Devices | Digital photo frame |
| | Digital camera |
| | eBook |

Solutions for Non-eMTC UEs (e.g. Higher End UEs

It will be appreciated that non-eMTC UEs may also implement eMTC functionality (including narrowband support, coverage enhancement techniques, etc.) when operating under bad channel conditions. However, as such non-eMTC UEs have more complex hardware and implementations than eMTC devices, they may still be able to retune within CP length or within one OFDM/SC-FDMA symbol.

In order to tailor the signalling for these types of UEs, the signalling proposed above may be modified as follows. For example, a 1-bit signalling (ON/OFF indication/flag/IE) by the communication device can be interpreted as follows:

ON (or '1'): the communication device 3 is capable of performing a retuning operation within a CP length; and OFF (or '0'): the communication device 3 is capable of performing a retuning operation within a single symbol (including CP).

In this case, once the base station knows the UE capability (as indicated above) it can apply a retuning period of CP length or one symbol. In the absence of such indication, the base station may be configured to apply a (default) retuning period of two symbols (at least until it receives UE retuning capability information from the communication device). In other words, the base station may be able to distinguish between three different retuning capabilities: i) normal (LTE) retuning capability within CP length (when indicated by the UE); ii) retuning within a single OFDM symbol (e.g. for regular UEs and advanced MTC devices, when indicated); and iii) retuning within a default period of two OFDM symbols (e.g. for simple MTC devices, in the absence of any indication).

The communication from the communication device to the base station, based on which the base station identifies the capability of that communication device to retune between narrowbands, may comprise at least one signalling message from the communication device (e.g. a Radio Resource Control message; a message relating to a random access procedure; a Feature Group Indicator message; and/or the like).

The at least one signalling message may include at least one of: a flag and an appropriately formatted information element (e.g. an "UL Transmission Gaps for long uplink transmissions" information element, an "MTC retuning capability" information element, and/or the like) configured to signal to the base station whether the communication device is capable of retuning between narrowbands within one symbol or within two symbols (e.g. Orthogonal Frequency Division Multiplexing, OFDM, symbols or Single Carrier Frequency Division Multiple Access, SC-FDMA, symbols).

The transceiver of the communication device may be operable to transmit the communication using communication resources that depend on the capability of the transceiver to retune between narrowbands. In this case, the controller of the base station may be configured to identify the capability of that communication device to retune between narrowbands based on the resources used for the communication received from that communication device.

The narrowbands may each cover a different respective frequency range, and the indexes of the narrowbands may increase sequentially with the frequency range covered by the narrowband that they represent. A number of narrowbands in the cell bandwidth may be defined using a formula as follows:

$$NB_{whole} \left\lfloor \frac{N_{RB}}{n} \right\rfloor \qquad \text{[Math. 11]}$$

where $NB_{whole}$ is the number of narrowbands in the cell bandwidth, $N_{RB}$ is a number of resource blocks in the cell bandwidth, n is a number of resource blocks in each narrowband; and $$\lfloor x \rfloor \qquad \text{[Math. 12]}$$

is a floor function (i.e. the largest integer not greater than 'x').

The control information may identify a number of symbols (e.g. Orthogonal Frequency Division Multiplexing, OFDM, symbols or Single Carrier Frequency Division Multiple Access, SC-FDMA, symbols) for retuning between narrowbands.

The control information may identify at least one punctured and/or shortened control format (e.g. Physical Uplink Control Channel (PUCCH) Format 1 or PUCCH Format 1a) for retuning between different narrowbands.

The control information may identify a frequency hopping pattern and/or a frequency mirroring pattern.

The base station may comprise a base station of a long term evolution (LTE) radio access network. The communication may comprise a machine-type communication ('MTC') device which is operable to communicate using a reduced bandwidth compared to the cell bandwidth.

Various other modifications will be apparent to those skilled in the art and will not be described in further detail here.

This application is based upon and claims the benefit of priority from United Kingdom patent application No. 1613407.4, filed on Aug. 3, 2016, the disclosure of which is incorporated herein in its entirety by reference.

The invention claimed is:

1. A method performed by a user equipment (UE) that can communicate using any of a plurality of narrowbands and has a capability of retuning from a first narrowband to a second narrowband within a retuning period of a single symbol, the method comprising:

sending, to a base station in radio resource control (RRC) signaling, a UE capability information element indicating the retuning capability of the UE; and controlling transmissions to the base station, in accordance with a physical uplink control channel (PUCCH) format and the retuning capability of the UE, wherein:

when the UE capability information element indicates that the UE is capable of UE retuning within a single symbol, in accordance with a shortened PUCCH format, the UE performs retuning and does not transmit using a last symbol in a first subframe.

2. The method according to claim 1, further comprising receiving, based on the retuning capability of the UE, control information from the base station identifying a number of symbols for retuning between narrowbands.

3. The method according to claim 1, further comprising receiving, based on the retuning capability of the UE, control information from the base station identifying at least one punctured and/or shortened control format for retuning between different narrowbands.

4. The method according to claim 1, further comprising receiving, based on the retuning capability of the UE, control information from the base station identifying a frequency hopping pattern and/or a frequency mirroring pattern.

5. The method according to claim 1, wherein the UE is UE that is restricted to operate within a limited bandwidth.

6. The method according to claim 1, wherein the narrowbands each cover a different respective frequency range, and wherein the narrowbands have indices that are numbered in order of increasing physical resource block number increase sequentially with the frequency range covered by the narrowband that they represent.

7. The method according to claim 6, wherein for a given cell bandwidth the number of narrowbands is defined using a formula as follows:

$$NB_{whole} \left\lfloor \frac{N_{RB}}{n} \right\rfloor \qquad \text{[Math. 1]}$$

where $NB_{whole}$ is the number of narrowbands in the cell bandwidth, $N_{RB}$ is a number of resource blocks in the cell bandwidth, n is a number of resource blocks in each narrowband; and

[Math. 2]

$\lfloor x \rfloor$ is a floor function (i.e. the largest integer not greater than 'x').

8. A method performed by a base station that can communicate with a user equipment (UE), using any of a plurality of narrowbands, the UE having a capability of retuning from a first narrowband to a second narrowband within a retuning period of a single symbol, the method comprising:

receiving, from the UE, in radio resource control (RRC) signaling, a UE capability information element indicating the retuning capability of the UE; and controlling the base station, in accordance with a physical uplink control channel (PUCCH) format and the retuning capability of the UE, wherein:

when the UE capability information element indicates that the UE is capable of retuning within a single symbol, in accordance with a shortened PUCCH format, the base station does not receive transmissions from the UE using a last symbol in a first subframe during which the UE performs retuning.

9. The method according to claim 8, wherein the base station is a base station of a long term evolution (LTE) radio access network.

10. A computer implementable instructions product comprising computer implementable instructions for causing a programmable communications device to perform the method of claim 1.

11. A user equipment (UE) that can communicate using any of a plurality of narrowbands, and having a capability of retuning from a first narrowband to a second narrowband within a retuning period of a single symbol, the UE comprising:

a controller and a transceiver wherein the controller is operable to:

control the transceiver to send, to a base station in radio resource control (RRC) signaling, a UE capability information element indicating the retuning capability of the UE; and control transmissions to the base station, in accordance with a physical uplink control channel (PUCCH) format and the retuning capability of the UE, wherein:

when the UE capability information element indicates that the UE is capable of retuning within a single symbol, in accordance with a shortened PUCCH format, the UE performs retuning and does not transmit in a last symbol in a first subframe.

12. A base station that can communicate with a user equipment (UE) using any of a plurality of narrowbands, the UE having a capability of retuning from a first narrowband to a second narrowband within a retuning period of a single symbol, the base station comprising:

a controller and a transceiver wherein the controller is operable to:

control the transceiver to receive, from the UE, in radio resource control (RRC) signaling, a UE capability information element indicating the retuning capability of the UE; and control reception by the transceiver, in accordance with a physical uplink control channel (PUCCH) format and the retuning capability of the UE, wherein:

when the UE capability information element indicates that the UE is capable of retuning within a single symbol, in accordance with a shortened PUCCH format, the base station does not receive transmissions from the UE in a last symbol in a first subframe during which the UE performs retuning.

13. A system comprising: the base station according to claim 12 and the user equipment.

* * * * *